(12) United States Patent
McGrath

(10) Patent No.: US 12,124,909 B2
(45) Date of Patent: Oct. 22, 2024

(54) MOTIONLESS CARD MAGNETIC STRIP READER

(71) Applicant: NCR Atleos Corporation, Atlanta, GA (US)

(72) Inventor: Shannon Louise McGrath, Perth (GB)

(73) Assignee: NCR Atleos Corporation, Atlanta, GA (US)

( * ) Notice: Subject to any disclaimer, the term of this patent is extended or adjusted under 35 U.S.C. 154(b) by 0 days.

(21) Appl. No.: 18/103,637

(22) Filed: Jan. 31, 2023

(65) Prior Publication Data

US 2024/0256800 A1 Aug. 1, 2024

(51) Int. Cl.
*G06K 7/08* (2006.01)
(52) U.S. Cl.
CPC .................................. *G06K 7/087* (2013.01)
(58) Field of Classification Search
CPC .................................................. G06K 7/087
See application file for complete search history.

(56) References Cited

U.S. PATENT DOCUMENTS

| 6,039,259 A * | 3/2000 | Mattson | G06K 13/08 |
| | | | 235/475 |
| 9,038,906 B1 * | 5/2015 | DeMerchant | G06K 7/082 |
| | | | 235/487 |
| 2015/0287289 A1 * | 10/2015 | Lewis | G07F 19/2055 |
| | | | 235/379 |

* cited by examiner

*Primary Examiner* — Matthew Mikels
(74) *Attorney, Agent, or Firm* — Schwegman Lundberg & Woessner, P.A.

(57) ABSTRACT

A magnetic strip of a card is read by a card reader while the card remains stationary and motionless within the card reader. The card is parked within the card reader in a read position. A dynamic read head of the card reader moves over the strip from a trailing edge of the inserted card to a leading edge of the card and then back from the leading edge of the card to the trailing edge of the card. A rate and speed of the read head is controlled during the passes of the read head over the strip. The card data of the strip is provided to a terminal during a transaction of a customer at the terminal.

9 Claims, 7 Drawing Sheets

MOTIONLESS CARD MAGNETIC STRIP READER

BACKGROUND

In current motorized card readers, in order for data on the magnetic strip of a card to be read, the card must move over the entire length of a stationary read head, forwards and backwards within a specific speed range. If the card does not travel the entire length, the speed is too slow or fast, or the movement is not continuous, then the data cannot be accurately read from the card. Because of these requirements, the card reader must be a minimum length to ensure the full length of the card passes over the read head. Since the read head is located a third of the way within the card reader, current card readers are nearly three card lengths long. Not only does this take up unnecessary space, but it also results in many serviceable parts including three sets of rollers.

Additionally, the location of the read head and the length of the card reader also permits skimming devices to go undetected from customers operating the card reader for a card transaction. The entire skimmer can be hidden from view of the shutter. Thus, the required lengths of existing card reader designs also pose a security threat.

Furthermore, card readers integrated into transaction terminals, such as automated teller machines (ATMs), need to account for the size of the card readers within the main housing. This additional space required for the card readers limits the ability to design smaller footprint terminals and/or limits the ability to add additional modules in the terminal to increase functionality of the terminals when an existing footprint of the terminals must be maintained.

SUMMARY

In various embodiments, a motionless card reader, a system for a motionless card reader, and a method of operating a motionless card reader are presented. A motionless card reader peripheral includes a dynamic magnetic read head that travels or moves along a track when a card is inserted at least one card's length within the motionless card reader. The card remains stationary and motionless during card reading within the motionless card reader. The dynamic read head moves from an initial position at a trailing edge of the card over the magnetic strip of the card to a second position at a leading edge of the stationary card, then the dynamic read head moves from the second position at the leading edge of the card back to the initial position at the trailing edge of the card to read card data encoded on the card. The card data is provided to a transaction terminal for a transaction of a customer at the terminal.

DETAILED DESCRIPTION

As stated above, existing card readers are required to be of a certain length because the magnetic strip of the card must completely pass over the magnetic read head, forward and backward, at a controlled rate of speed. To achieve this, the card itself is moved or transported over an internal read head located about one-third of the way inside the card reader. The card reader is required to be a minimum of three card lengths in length. This design permits skimmers to be placed within the card reader at a depth that is visibly undetectable to customers using the card reader. This design also limits the ability to reduce the footprint of the terminals that include the card readers. Moreover, the design includes many components and parts that increase the complexity and time associated with servicing the card reader.

The teachings herein provide a novel motionless card reader that includes less serviceable components/parts and is smaller in size than existing card readers. Furthermore, the motionless card reader includes a read head that travels or moves along a track to read a magnetic strip of the card within the motionless card reader while the card itself remains motionless. The initial position of the read head without a card inserted for reading is adjacent to the shutter assembly of the motionless card reader. As a result, any skimmer attempted to be placed within the motionless card reader would be visibly detected by a customer as an anomaly and also reduces the area of interest for new technologies to detect and prevent skimmers. The rate of movement or speed of the read head is controlled by a controller of the motionless card reader to ensure proper reading of the magnetic strip of a card.

The phrase "motionless card reader" is intended to mean that a card inserted into the card reader is motionless when read by a read head of the card reader. So, unlike conventional motorized card readers a card is read by motionless card reader when the card is stationary, parked, and motionless within the motionless card reader. During a card read, only the read head moves or has motion within the motionless card reader.

FIGS. 1A-2C are shown from the perspective of the underside of card readers 110 and 210. Thus, some componentry that is unnecessary to comprehending the teachings is not illustrated.

Furthermore, card reader 210 as discussed herein and below is a motorized card reader 210 meaning a card 120 entered through a shutter assembly 213 detects the card and draws or urges the card 120 into the card reader 210 for card reading. Additionally, card reader 210 includes componentry to read chip-based cards. Thus, card reader 210 is both a chip card reader and a magnetic strip card reader. The chip read head is not illustrated from the perspective of the figures, but it is noted that a chip read head is present within the card reader 210.

Figure 1A:
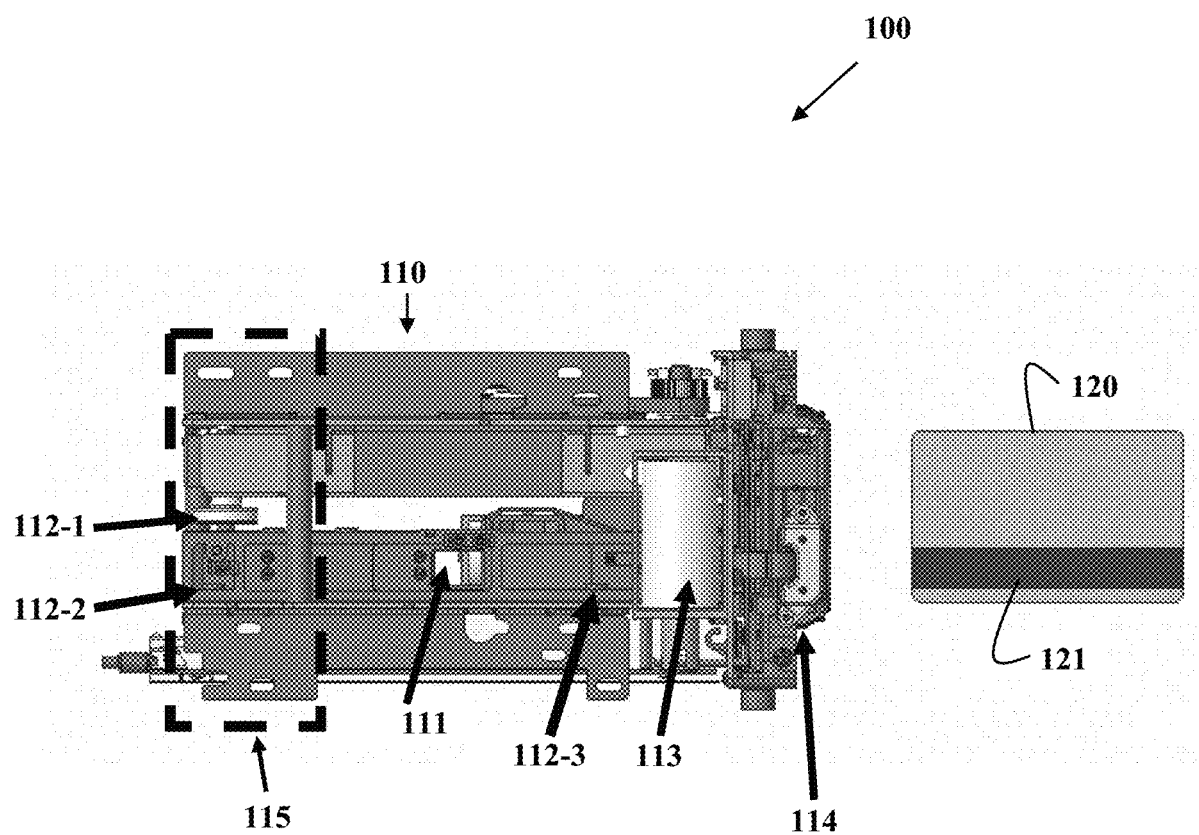
FIG. 1A is a diagram of a prior art card reader.

FIG. 1A is a diagram 100 of a prior art card reader 110. There are three sets of rollers 112-1, 112-2, and 112-3. A solenoid 113 for chip card reading is visible adjacent to the shutter assembly 114 from the underside of card reader 110.

The read head 111 is positioned about a card's length within the card reader 110 from the shutter assembly 114. A card 120 with a magnetic strip 121 is shown in diagram 100 in a proper orientation for entry into card reader 110 so that read head 111 can read the magnetic strip 121 as the card is moved/transported within the card reader 110 with the magnetic strip 121 completely passing over the read head 111 twice, forward and backward. The area 115 identified in diagram 100 by the broken lines is an excess area of card reader 110 that is eliminated with the novel motionless card reader 210 presented herein.

Figure 1B:
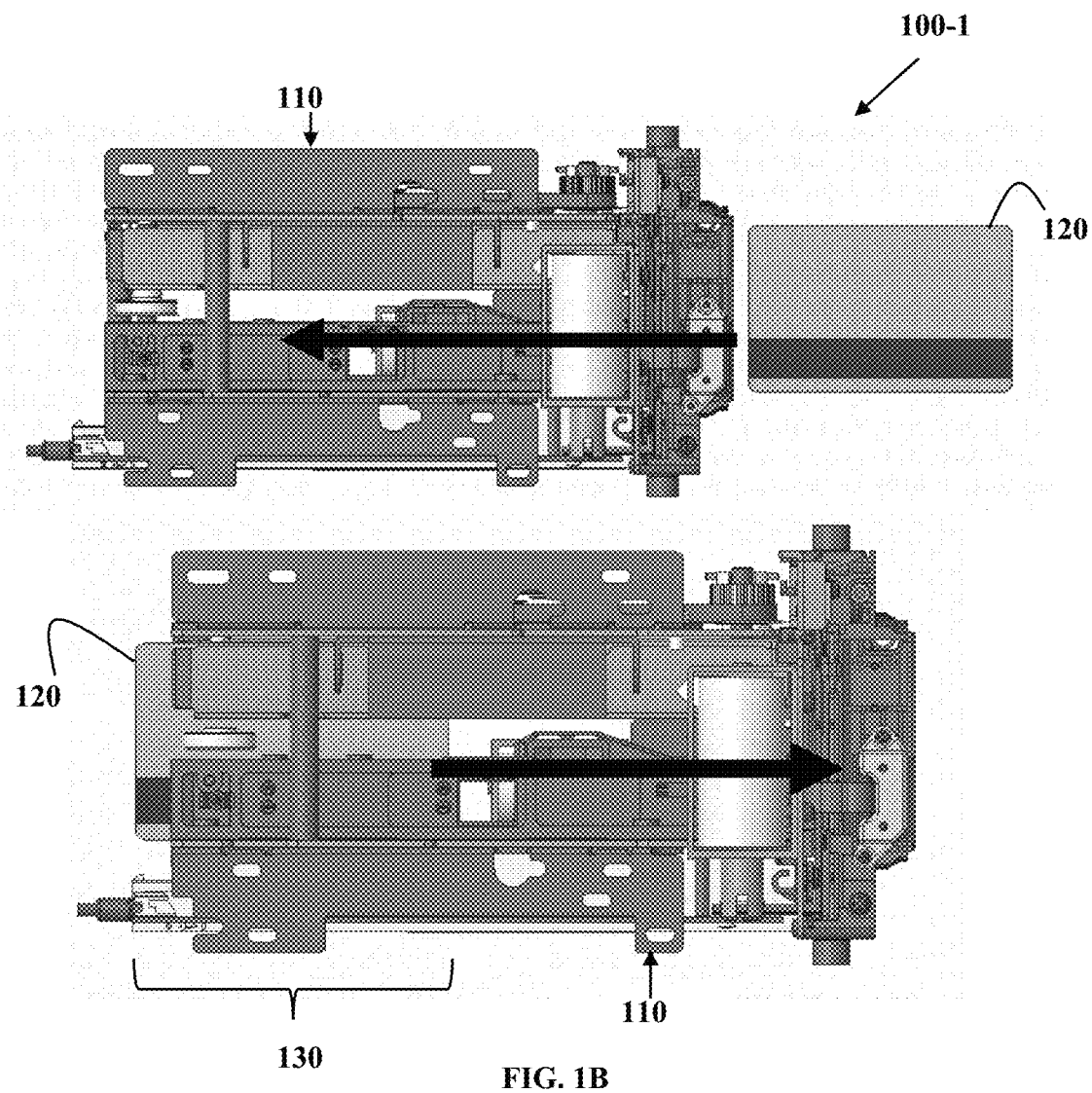
FIG. 1B is a diagram illustrating a card inserted and transported/moved within a prior art card reader for reading the magnetic strip of the card.

FIG. 1B is a diagram 100-1 illustrating a card 120 inserted and transported/moved within a prior art card reader 110 for reading the magnetic strip 121 of the card 120. The top figure in diagram 100-1 illustrates the card reader 110 just prior to entry of the card 120 through the shutter assembly 114. The bottom figure in diagram 100-2 illustrates the position of the card 120 within card reader 110 after the magnetic strip 121 has made a complete forward pass over the read head 111 and before the card 110 makes a backward pass over the read head 111 and is ejected out of the shutter assembly 114. Notice the excess length 130 of the card reader 110 required to ensure the trailing edge of strip 121 passes completely over read head 111 before the trailing edge of strip 121 can be moved or transported backwards over read head 111 and ejected out of shutter assembly 114. The excess length 130 and total area 115 (shown in FIG. 1A) is eliminated with the novel motionless card reader 210 presented herein.

Figure 2A:
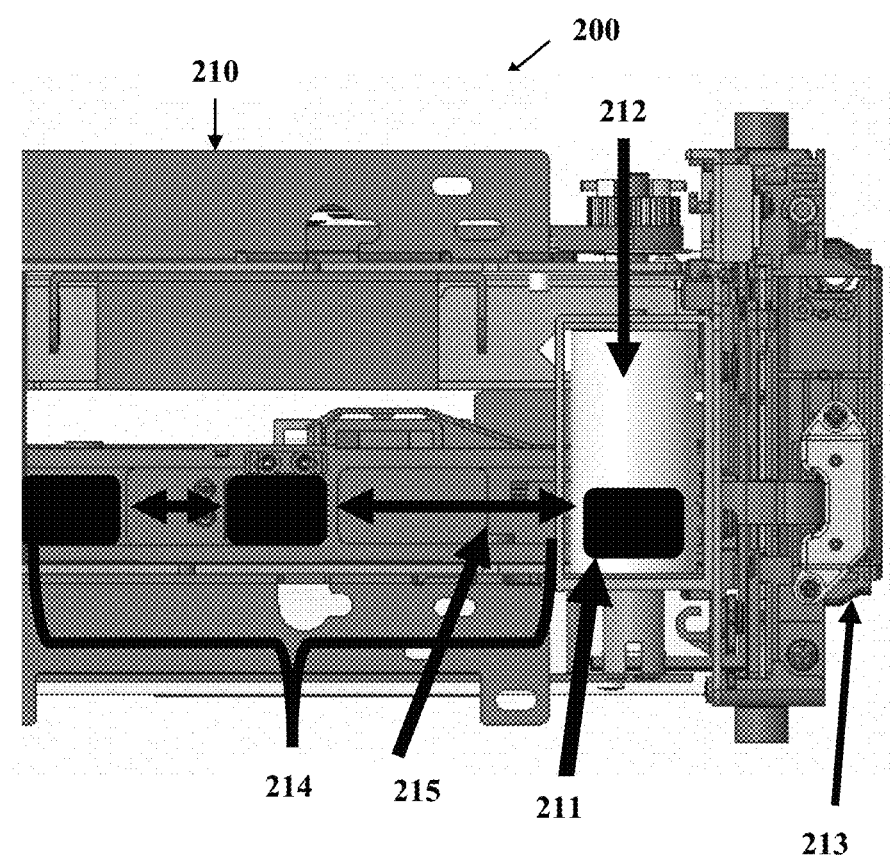
FIG. 2A is a diagram of a motionless card reader without a card inserted in the reader, according to an example embodiment.

FIG. 2A is a diagram 200 of a motionless card reader 210 without any card 120 inserted for card reading, according to an example embodiment. The diagram 200 illustrates the motionless card reader 210 implemented with a length and area that are less than the existing card reader 110 (by length 130 and area 115). Furthermore, diagram 200 is shown schematically in greatly simplified form, with only those components relevant to understanding of one or more embodiments (represented herein) being illustrated. It is to be noted that other arrangements with more or less components are possible without departing from the teachings of a motionless card reader 210 presented herein.

Motionless card reader 210 includes a dynamic and movable read head 211, a solenoid 212 associated with the chip reader of motionless card reader 210 and visible from the underside perspective of reader 210, a shutter assembly 213, a read head transport track 214, and a single set of rollers 215. Read head 211 is illustrated in diagram 200 for visibility, it is to be noted that the read head 211 is oriented so as to face and pass over magnetic strip 121 when card 120 is inserted into motionless card reader 210. Diagram 200 illustrates the read head 211 is three positions along track 214 for purposes of showing the that read head 211 is dynamic and moves along track 214.

Additionally, although diagram 200 does not illustrate a motor, card reader 210 includes a motor or solenoid located in any available area on the underside of card reader 210. Furthermore, the motor can be smaller in size from that which is needed by card reader 110 because the card 120 is not being transported deep within the motionless card reader 210, rather the card 120 is parked and remains stationary one card's length within motionless card reader 200 and read head 211 travels or moves along track 214 forward and backward over strip 121. Furthermore, motionless card reader 210 includes and utilizes only a single set of rollers 215 as opposed to three sets of rollers 112-1, 112-2, and 112-3 used in card reader 110.

In an embodiment, read head 211 is attached to moving track 214 and moving track 214 includes a motor or a solenoid on a slide. The moving track 214, motor, and read head 211 is a single assembly or module which permits easy access for service engineers to replace.

The design of motionless card reader 210 is such that read head 211 is parked adjacent to shutter assembly 213 when no card is inserted into motionless card reader 210. This restricts the number of possible locations for successfully inserting internal skimmers and permits service engineers to concentrate on this area for security features.

Figure 2B:
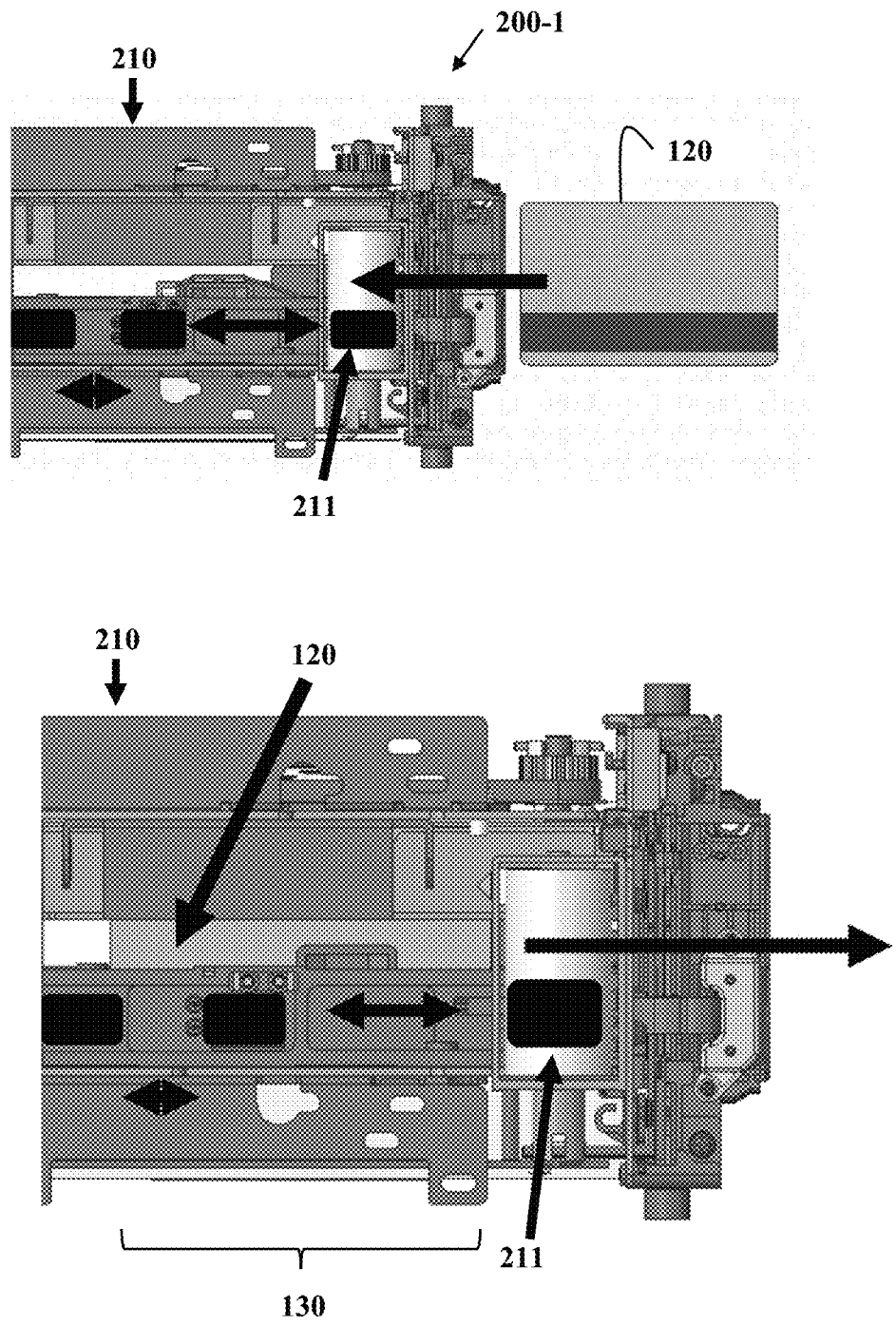
FIG. 2B is a diagram illustrating a card inserted and positioned in a read position for a read head of the motionless card reader of FIG. 2A, according to an example embodiment.

FIG. 2B is a diagram 200-1 illustrating a card 120 prior to insertion into motionless card reader 210 and after insertion with card 120 parked in a read position for read head 211, according to an example embodiment.

The top figure of diagram 200-1 illustrates a location of movable read head 211 prior to a card insertion into motionless card reader 210. The bottom figure of diagram 200-1 illustrations a position of card 120 after insertion into motionless card reader 210. The double arrows illustrated in diagram 200-1 is intended to illustrate that read head 211 is dynamic and travels or moves along track 214 while card 120 is motionless and remains stationary within motionless card reader 210. Dynamic read head 211 moves along track 214 to perform a first forward pass over strip 121 of card 120 and then moves back along track 214 to perform a second backward pass over strip 121 of card 120 to read card data on strip 121. Card 120 remains stationary in a read position within motionless card reader 210 and is motionless during the reading by read head 211. Thus, the rate of movement of card 120 is not controlled since it does not move during card reading; rather, the rate of movement or speed of read head 211 is controlled during card reading by a controller of the motionless card reader 210.

Figure 2C:
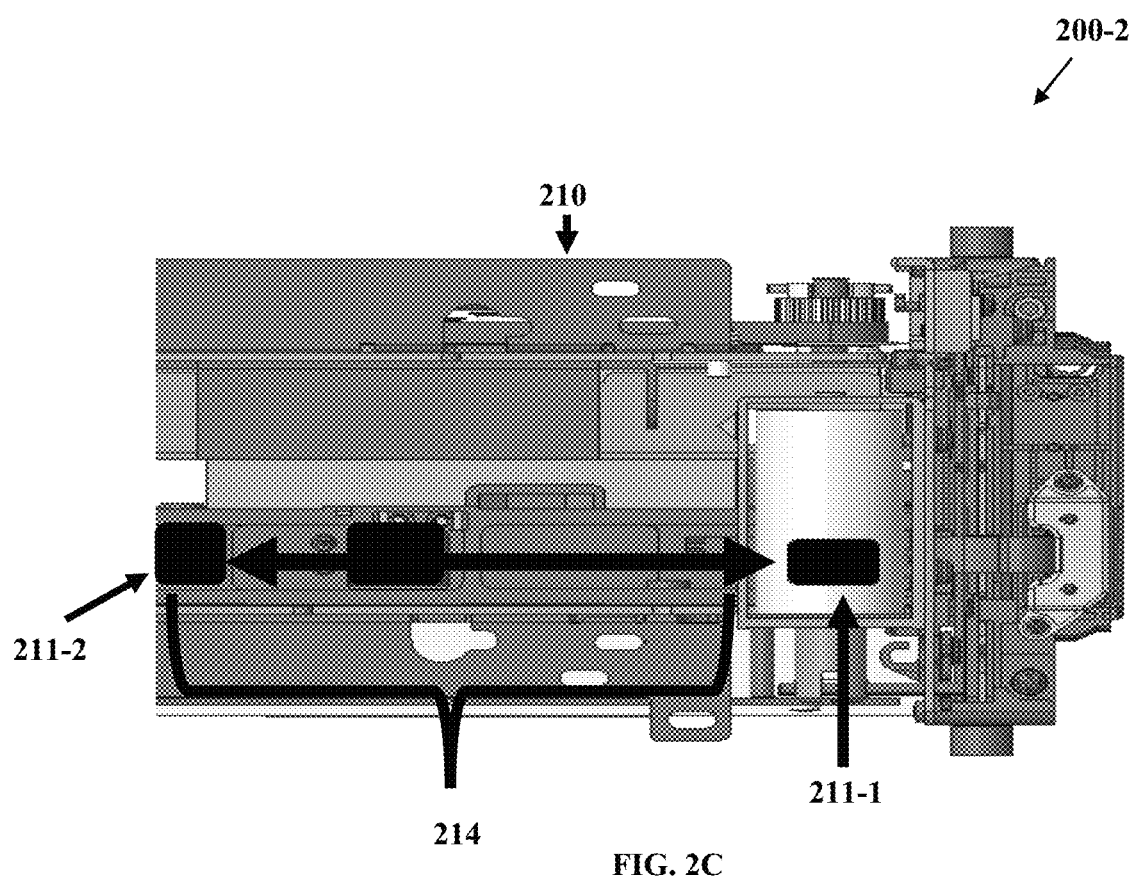
FIG. 2C is a diagram illustrating a card fully inserted and positioned in a read position for the motionless card reader of FIG. 2A, according to an example embodiment.

FIG. 2C is a diagram 200-2 illustrating a card 120 fully inserted and positioned in a read position for the motionless card reader 210, according to an example embodiment. Motionless card reader 210 can be a single card's length in length plus a length of shutter assembly 213. Thus, the length of motionless card reader 210 is substantially reduced from the length associated with card reader 110 by area 115 and length 130. Moreover, only a single set of rollers 215 are needed to just draw in card 120 and park card 120 in a motionless, stationary, and parked position within motionless card reader 210. Thus, components or parts of motionless card reader 210 are less than that which is associated with and needed by card reader 110.

As a result, motionless card reader 210 has both a smaller physical footprint and less serviceable components/parts than card reader 110. The smaller footprint enables a transaction terminal associated with motionless card reader 210 to reduce the terminal's overall size and dimensions and/or maintain the terminal's existing overall size and dimensions and integrate or expand other modules of the terminal for increased functionality of the terminal without increasing the footprint of the terminal.

Dynamic read head 211 is in a first position 211-1 prior to card 120 insertion and remains in the first position 211-1 until card 120 is parked and stationary within motionless card reader 210. Read head 211 dynamically moves along track 214 to perform a first pass ending at position 211-2. Read head 211 dynamically moves in an opposite direction along track 214 to return to position 211-1.

A sensor (not shown in diagram 200-3) of motionless card reader 210 indicates that card 120 is fully inserted one card's length and is in a stationary and parked position for reading strip 121. This causes dynamic read head 211 to move forward for one card's length over strip 121 until read head 211 reaches position 211-2 at which point read head 211 returns backward over strip 121 to the initial and starting position 211-1. The two passes over strip 121 allows read head 211 to complete read card data encoded on strip 121 for a card transaction of a customer at a terminal. The card 120 itself is stationary or motionless while read head 211 is dynamic and travels along track 214 from position 211-1 to position 211-2 and back to position 211-1.

Figure 3:
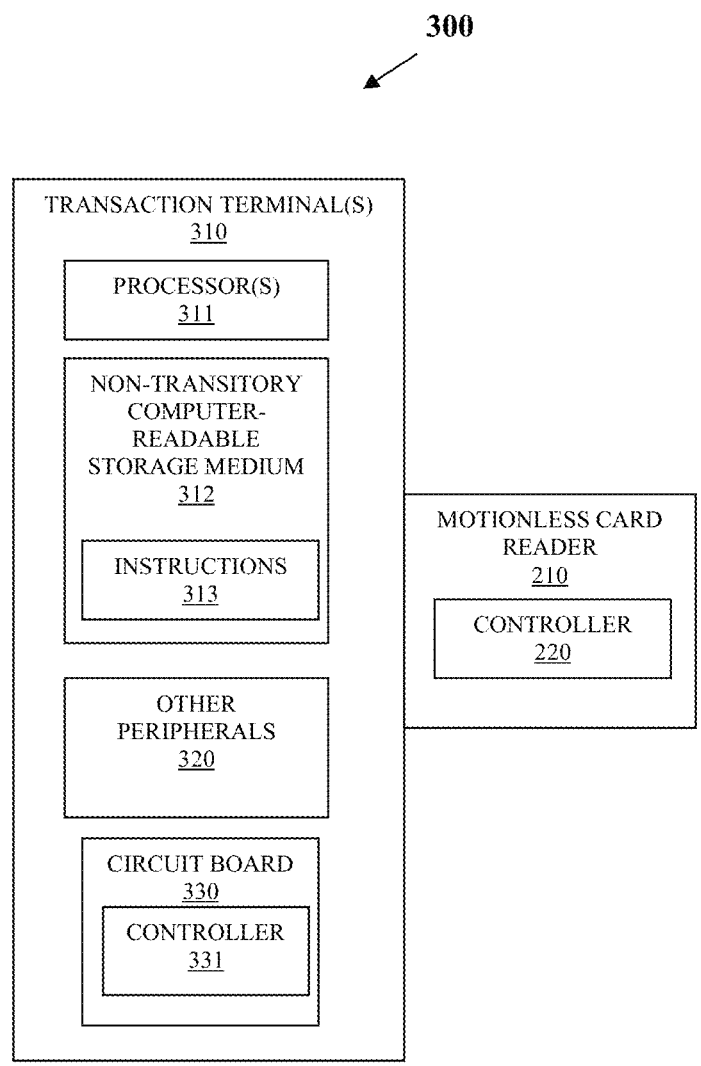
FIG. 3 is a diagram of a system for a motionless card reader, according to an example embodiment.

FIG. 3 is a diagram of a system 300 for a motionless card reader 200-3, according to an example embodiment. The system 300 is shown schematically in greatly simplified form, with only those components relevant to understanding of one or more embodiments (represented herein) being illustrated. The various components are illustrated, and the arrangement of the components are presented for purposes of illustration only. It is to be noted that other arrangements with more or less components are possible without departing from motionless card reading techniques presented herein and below.

System 300 includes a transaction terminal 310 and motionless card reader 210. Terminal 31 includes a processor 311, non-transitory computer-readable storage medium 312, and other peripherals 320. Medium 312 includes executable instructions 313 to operate, interact with peripherals 320, interact with motionless card reader 210, and perform transactions of customers. Motionless card reader 210 is also a peripheral of terminal 310.

In an embodiment, system 300 includes a circuit board 330 with a controller 331. The controller 331 controls the electromechanical components of the motionless card reader 210 to detect an inserted card 120 and move the dynamic read head 211 over the magnetic strip 121 and back to obtain card data for the card 120.

The other peripherals 320 can include a media depository, media dispenser, media recycler, a coin acceptor/dispenser, personal identification number (PIN) pad, an encrypted PIN pad (EPP), a wireless transceiver, a near-field communication (NFC) transceiver, touch display, receipt printer, bioptic scanner, a vertical scanner, a horizontal scanner, a handheld scanner, weigh scale, baggage scale, keyboard, camera, etc. In an embodiment, terminal 310 is an ATM, a self-service terminal (SST), a point-of-sale (POS) terminal, or a kiosk.

During a card transaction at terminal 310, a customer or a cashier on behalf of the customer inserts a card 120 into the shutter assembly 213 of motionless card reader 210. Motionless card reader 210 urges or draws card into a read position within motionless card reader 210 and parks the card 120 in a stationary and motionless position. Dynamic read head 211 moves from a first position 211-1 to a second position 211-2 over strip 121 of card 120 and then moves back over strip 121 from the second position 211-2 back to the first position 211-1 to read card data for the customer's card 120. The card data is then provided to a set of instructions 313 associated with processing the card data for the transaction. The card data can be related to a purchase transaction and include payment details of the customer or can be related to a loyalty account of the customer for purposes of obtaining customer details for the transaction.

In an embodiment, motionless card reader 210 includes a controller 220, such as a processor and a non-transitory computer-readable storage medium with firmware instructions. The instructions when provided to the controller 220 detects a card 120 inserted into the motionless card reader 210, moves the dynamic read head 211 from a trailing edge of a magnetic strip 121 for the card 120 to a leading edge of the magnetic strip 121 and back to the trailing edge, and provided card data obtained by the dynamic read head 211 back to instructions 313 of terminal 310 during a transaction at terminal 310.

Figure 4:
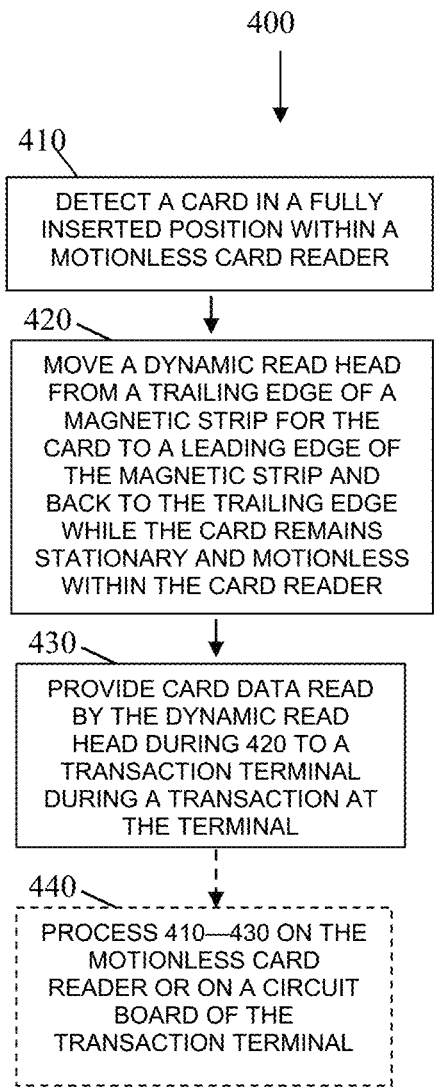
FIG. 4 is a diagram of a method for operating the motionless card reader, according to an example embodiment.

FIG. 4 is a diagram of a method 400 for operating the motionless card reader, according to an example embodiment. The method 400 is implemented as firmware or software instructions within motionless card reader 210 as controller 220 or as firmware or software instructions within terminal 310 as controller 331 for purposes of controlling the electromechanical components of motionless card reader 210 to read card data from a magnetic strip on a card 120 during a transaction at terminal 300. Controller 331 or 220 includes at least one processor and a non-transitory computer-readable storage medium, which includes the firmware or software instructions. The firmware or software instructions when executed by the processor cause the processor to perform the operations of method 400.

At 410, the controller, detects a card 120 an a fully inserted position within a motionless card reader 210. The fully inserted position for card 120 is illustrated in FIGS. 2B (bottom figure) and 2C above. A fully inserted position is when the card 120 is substantially entered a card's length for the card behind shutter assembly 213.

At 420, the controller, moves a dynamic read head 211 from a trailing edge of a magnetic strip 121 for the card 120 to a leading edge of the magnetic strip 121 and back to the trailing edge while the card 120 remains stationary and motionless within the card reader 120. The dynamic read head 211 passed completely over a length of the magnetic strip 121 twice by the dynamic read head 211 moving forward from position 211-1 to position 211-2 for a first pass and back from position 211-2 to position 211-1 for a second pass.

At 430, the controller, provided card data read by the dynamic read head during 420 to a transaction terminal 310 during a transaction at terminal 310.

In an embodiment, at 440, the controller is processed on the motionless card reader 210 or on a circuit board 330 of terminal 310. In an embodiment, circuit board 330 can also process other controllers for one or more of the other peripherals 320 of terminal 310.

It should be appreciated that where software/firmware is described in a particular form (such as a component or module) this is merely to aid understanding and is not intended to limit how software/firmware that implements those functions may be architected or structured. For example, modules are illustrated as separate modules, but may be implemented as homogenous code, as individual components, some, but not all of these modules may be combined, or the functions may be implemented in software/firmware structured in any other convenient manner.

Furthermore, although the software/firmware modules are illustrated as executing on one piece of hardware, the software/firmware may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A system, comprising:
   a transaction terminal;
   a motionless card reader interfaced and integrated into the transaction terminal as a peripheral device; and
   the motionless card reader comprises:
   a movable track; and
   a dynamic read head attached to the moveable track and adapted to move forward and backward over a magnetic strip of a card inserted into the motionless card reader during a card read while the card is stationary and remains motionless during card reading within the motionless card reader.

2. The system of claim 1, wherein the transaction terminal is an automated teller machine, a self-service terminal, a point-of-sale terminal, or a kiosk.

3. The system of claim 1, wherein the motionless card reader further includes a shutter assembly, wherein the dynamic read head is positioned adjacent to the shutter assembly after the card read and when the motionless card reader does not include any card inserted for any card read.

4. The system of claim 1, wherein the moveable track has a length that is substantially equal to a card length of the card.

5. The system of claim 1, wherein the motionless card reader further includes a single set of rollers.

6. The system of claim 1, wherein the motionless card reader is adapted to read card data from the magnetic strip and provide the card data to the transaction terminal during a card transaction at the transaction terminal.

7. The system of claim 1, wherein a length of the motionless card reader is less than a length associated with an existing card reader that moves cards over a stationary read head during card reading, and wherein a total number of component parts of the motionless card reader is less than a total number of component parts associated with the existing card reader.

8. A method comprising:
   detecting, by a controller associated with a motionless card reader, a card in a fully inserted position within the motionless card reader;
   moving, by the controller, a dynamic read head from a trailing edge of a magnetic strip for the card to a leading edge of the magnetic strip and back to the trailing edge while the card remains stationary and the card remains motionless during card reading within the motionless card reader; and
   providing, by the controller, card data read by the dynamic read head during the moving to a transaction terminal during a transaction at the transaction terminal.

9. The method of claim 8, wherein the controller resides in the motionless card reader or on resided in a circuit board of the transaction terminal.

* * * * *